United States Patent
Smith et al.

(10) Patent No.: US 10,623,280 B2
(45) Date of Patent: Apr. 14, 2020

(54) DIAGNOSTIC TESTING

(71) Applicant: BRITISH TELECOMMUNICATIONS PUBLIC LIMITED COMPANY, London (GB)

(72) Inventors: Alan Smith, London (GB); Trevor Burbridge, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 97 days.

(21) Appl. No.: 15/558,301

(22) PCT Filed: Mar. 14, 2016

(86) PCT No.: PCT/EP2016/055477
§ 371 (c)(1),
(2) Date: Sep. 14, 2017

(87) PCT Pub. No.: WO2016/150748
PCT Pub. Date: Sep. 29, 2016

(65) Prior Publication Data
US 2018/0062947 A1    Mar. 1, 2018

(30) Foreign Application Priority Data

Mar. 20, 2015 (EP) .................... 15275083

(51) Int. Cl.
*H04L 29/08* (2006.01)
*H04L 12/24* (2006.01)
(Continued)

(52) U.S. Cl.
CPC .......... *H04L 41/5067* (2013.01); *H04L 43/02* (2013.01); *H04L 43/026* (2013.01);
(Continued)

(58) Field of Classification Search
CPC combination set(s) only.
See application file for complete search history.

(56) References Cited

U.S. PATENT DOCUMENTS

2010/0030874 A1\* 2/2010 Ormond ............. H04L 43/0817
709/220
2011/0161484 A1\* 6/2011 Van den Bogaert ........................
H04L 43/0876
709/224

(Continued)

FOREIGN PATENT DOCUMENTS

| EP | 2 632 100 | 8/2013 |
|----|-----------|--------|
| EP | 2 784 984 | 10/2014 |
| WO | WO 2014/166523 | 10/2014 |

OTHER PUBLICATIONS

International Search Report for PCT/EP2016/055477 dated Jun. 13, 2016, 4 pages.

(Continued)

*Primary Examiner* — Philip J Chea
*Assistant Examiner* — Wuji Chen
(74) *Attorney, Agent, or Firm* — Nixon & Vanderhye P.C.

(57) ABSTRACT

Methods and apparatus are disclosed for diagnostic testing, and in particular to methods and apparatus for obtaining diagnostic test results in respect of network-reliant applications used by one or more devices (1, 1') in a local user network (3), the one or more user-devices (1, 1') being operable to communicate with a digital communications access network (5, 6, 8) via a network gateway device (2) having a control module associated therewith, and being operable to communicate with remote networked devices (7, 9) involved in said network-reliant applications via the access network. Preferred embodiments relate to methods and apparatus for triggering diagnostic testing procedures and obtaining test results indicative of the actual Quality of (Continued)

Experience (QoE) of one or more users of the applications being run on the user-devices (1, 1') in the user network (3).

19 Claims, 3 Drawing Sheets

(51) Int. Cl.
*H04L 12/26* (2006.01)
*H04L 12/28* (2006.01)

(52) U.S. Cl.
CPC ...... *H04L 43/0811* (2013.01); *H04L 43/0864* (2013.01); *H04L 43/12* (2013.01); *H04L 43/50* (2013.01); *H04L 12/2898* (2013.01); *H04L 43/0829* (2013.01); *H04L 43/0894* (2013.01)

(56) References Cited

U.S. PATENT DOCUMENTS

| | | | | |
|---|---|---|---|---|
| 2013/0262659 | A1* | 10/2013 | Parthasarathy | H04L 41/5083 709/224 |
| 2016/0036632 | A1* | 2/2016 | Tanigawa | G06F 11/3442 709/220 |
| 2016/0044520 | A1* | 2/2016 | Iyer | H04W 24/08 370/252 |
| 2016/0283352 | A1* | 9/2016 | Kraus | G06F 3/0482 |

OTHER PUBLICATIONS

Written Opinion of the ISA for PCT/EP2016/055477 dated Jun. 13, 2016, 9 pages.

Search Report for EP15275083.2 dated Sep. 2, 2015, 8 pages.

Bagnulo et al., "Building a standard measurement platform", *IEEE Communications Magazine*, vol. 52, No. 5, May 1, 2014, pp. 165-173.

[Online], Samknows: "Samknows Test Methodology Fact Sheet", Jun. 1, 2010, pp. 1-2, https://www.samknows.com/broadband/uploads/FACTSHEET_2_Test_Methodology.pdf, retrieved Aug. 25, 2015.

[Online], Samknows: "Test Methodology and technical information relating to the SamKnows testing platform", Feb. 27, 2015, pp. 1-15, https://www.samknows.com/broadband/uploads/SQ301-005-EN-Test-Suite-Whitepaper-4.pdf, retrieved Aug. 25, 2015.

[Online], Samknows: "Samknows Test Methodology—Methodology and technical information relating to the SamKnows testing platform", Sep. 2014, 11 pages, https://www.samknows.com/broadband/uploads/methodology/SQ301-003-EN-Test-Suite-Whitepaper.pdf.

Ookla, "Measuring and Understanding Broadband: Speed, Quality and Application", Jun. 8, 2010, 12 pages, http://www.ookla.com/docs/UnderstandingBroadbandMeasurement.pdf.

* cited by examiner

DIAGNOSTIC TESTING

This application is the U.S. national phase of International Application No. PCT/EP2016/055477 filed Mar. 14, 2016 which designated the U.S. and claims priority to EP Patent Application No. 15275083.2 filed Mar. 20, 2015, the entire contents of each of which are hereby incorporated by reference.

TECHNICAL FIELD

The present invention relates to diagnostic testing, and in particular to methods and apparatus for obtaining diagnostic test results in respect of network-reliant applications used by one or more devices in a user network. Preferred embodiments relate to methods and apparatus for triggering diagnostic testing procedures and obtaining test results indicative of the actual Quality of Experience (QoE) of one or more users of applications being run on networked user-devices in a user network.

BACKGROUND TO THE INVENTION AND PRIOR ART

Assessing the performance of Internet Protocol (IP) based and other networks has long been a concern, not only for Internet Service Providers (ISPs) but also for users, standards bodies, network equipment vendors, regulators and others.

In relation to network and communications technology, the terms "Quality of Service" (QoS) and "Quality of Experience" (QoE) are often used, the former relating generally to an objective (or at least substantially objective) measure of performance in respect of the network or communications service provided to customers, and the latter relating generally to a subjective (or at least substantially subjective) measure indicative of how satisfied users are likely to be with the services provided to them.

"Quality of Service" can be defined and measured in various ways, taking account of various different criteria (including network characteristics such as loss, delay, jitter and throughput), but once defined, it can (at least theoretically) be measured, because such network characteristics can be measured, and values in respect thereof can then be combined (if required) according to a predetermined function in order to obtain one or more "QoS measures", "QoS values" or other such "QoS indications". "Quality of Experience", while generally being dependent on the same or similar criteria, and therefore generally being dependent at least in part on the "Quality of Service" being achieved in respect of the service or services provided to an individual customer (and therefore generally correlating to some extent with the "Quality of Service" being achieved for that customer), is essentially a subjective measure, so cannot generally be measured directly, other than by obtaining feedback directly from customers as to their satisfaction levels with the services concerned (which themselves will generally be subjective—they may be affected by the mood of the customer concerned, or whether the customer has previous experience of other comparable services being better or worse). "Quality of Experience" can however be estimated or assessed in various ways, generally taking account of one or more types of performance criteria such as those generally used to obtain "Quality of Service" measures, then estimating the effect(s) of these on the experience of a service, as it will be perceived by the customer. Thus, while "Quality of Experience" is generally a subjective measure, it can—once suitably defined—also be estimated, assessed or evaluated in an objective manner, based (at least partly) on measurable network performance data.

Methods exist for testing generic services and/or making network performance measurements in respect of various different characteristics. In relation to end-to-end testing of broadband services, two methods now predominate: (i) test websites; and (ii) probe-based tests.

With test websites, a browser application or "app" is used to conduct tests between a user's device and a remote test-server, e.g. www.speedtest.net by Ookla. A series of packets are sent between the user's device and a remote test-server allowing network characteristics such as Round Trip Time (RTT), throughput, jitter and loss to be calculated.

With probe-based tests, companies such as SamKnows (www.samknows.com) use a panel of users who are provided with a probe device for use in their homes/offices/local networks. These probe devices then perform tests involving exchanges with a number of test-servers to measure network characteristics. The probe devices may also test the behaviour of typical internet applications such as Voice over IP (VoIP) communication and web-browsing. Web-browsing may be tested by loading a few popular websites and recording page-load times, for example. The probe devices provided to the panel of users are normally paid for by the organisation wanting to do the testing, which is generally a network owner or a regulator.

An article entitled: "Measuring and Understanding Broadband: Speed, Quality and Application", dated 8 Jun. 2010 from "Ookla" (available online at: http://www.ookla.com/docs/UnderstandingBroadbandMeasurement.pdf) discusses Ookla's recommended techniques. These are for web-based network performance measurements, and the article explains the authors' reasoning for measuring " . . . the maximum sustainable throughput of a connection at a given location to and from a server of their choosing".

A document entitled: "SAMKNOWS TEST METHODOLOGY—Methodology and technical information relating to the SamKnows testing platform" dated September 2014 from "SamKnows" having a Document Ref: SQ301-003-EN (available online at: https://www.samknows.com/broadband/uploads/methodology/SQ301-003-EN-Test-Suite-Whitepaper.pdf) discusses various performance tests that can be made in respect of broadband connections. This document discusses generic probe-based measurement of network performance characteristics, including some application specific testing.

Various prior art documents indicate that they aim to measure (or at least estimate) QoE rather than simply QoS or network performance, but these issues are often confused.

European patent application EP2632100 (for example) relates to systems and methods for traffic management, and discloses a traffic management system having a " . . . quality of experience (QoE) measurement module configured to monitor a QoE metric in real-time".

United States application US 2013/0262659 relates to measuring web-browsing quality of experience in real-time at an intermediate network node, based on the time taken for web-pages to be downloaded.

European patent application EP2784984 relates to techniques for monitoring network performance in respect of a digital communications network comprising a user-network having at least one user-device therein that is able to submit requests for data to and receive data from one or more remote servers via an intermediate control module, and an access network via which data may be delivered to the user-network via the control module, and in particular discloses techniques that allow a network service provider providing network services via an access network to its customers' home networks to have visibility on the performance of its customers' home networks and/or on the performance of one or more networked devices within those customers' home networks.

Current methods of QoE assessment/measurement in respect of broadband lines generally only measure the general performance of lines, however, typically measuring bandwidth and connectivity to a few dedicated test-servers. Some application-specific tests attempt to measure QoE for applications such as generic VoIP (to a dedicated test-server again) or for a particular service (e.g. a particular website or other web-service such as YouTube).

Assessing the Quality of Experience that customers achieve (or more correctly, perceive) in relation to networked services provided over their broadband lines or other such network connections is of great importance to network providers or ISPs, because how customers rate the service they receive from their internet-connected computing and telephony devices depends to a large extent on the QoE they perceive for internet-delivered services (as opposed to the (objective) Quality of Service (QoS) that is actually being achieved).

While methods exist for testing generic services, as indicated above, it will be noted that such methods are not directed to testing those services that individual customers actually use. Customers generally judge the performance of their ISP on the quality of the applications and services they are actually using or (frequently or generally) actually use, however. They may, for example, be communicating (or may frequently communicate) with relatives in another country or other countries using a particular VoIP service, accessing websites that are not on a generic, pre-determined test-schedule, using different video services, etc.

Moreover, types of network characteristic that can be taken into account in obtaining measurements of QoS (e.g. loss, delay, jitter, throughput, etc.) can affect different network-reliant applications in different ways and to different extents, so changes in relation to network characteristics that would generally have the same or a similar effect on respective QoS measures for different customers may well have very different effects on respective QoE measures for those different customers (or for the same customer at different times). This means that while the QoE perceived will generally still show some level of correlation with the QoS that is being achieved, the QoE at a particular time may be particularly affected by changes in respect of network characteristics that do not have such a significant effect on the QoS, or vice versa, thereby weakening or removing any such correlation. The extent to which any such correlation will be affected may depend on the extent to which the network characteristics concerned affect the network-reliant applications that are actually being used by the respective customers (or by the same customer at different times).

Referring briefly to other prior disclosures, International application WO2014/166523 ("Nokia") relates to methods and apparatus which aim to provide insight into the user experience of web-based applications. One such method involves collecting and measuring application level Key Performance Indicators (KPIs), detecting user actions by monitoring network side user traffic in a network, correlating the user actions with the KPIs in order to evaluate and quantify a quality of experience (QoE) of the user, and correlating poor QoE with network side KPIs to determine an underlying root cause of the poor QoE.

A paper entitled "Building a Standard Measurement Platform" by Bagnulo et al (IEEE Communications Magazine, vol. 52, no. 5, May 2014) discusses how network management is achieved via different solutions for different technologies and parts of the end-to-end network, and how gaining an overall view and predicting the impact on a service user is difficult. It discusses how a number of proprietary platforms have emerged to conduct end-to-end testing from user premises, and how these are limited in scale, interoperability, and the ability to compare like-for-like results. Taking the SamKnows platform as a use case, an evolution is proposed from its current proprietary protocols to standardized protocols and tests.

SUMMARY OF THE INVENTION

According to a first aspect of the invention, there is provided a method of obtaining diagnostic test results in respect of network-reliant applications used by one or more user-devices in a local user network, the one or more user-devices being operable to communicate with a digital communications access network via a network gateway device having a control module associated therewith, and being operable to communicate with remote networked devices involved in said network-reliant applications via the access network, the method comprising:

the control module monitoring communications between the one or more user-devices and the remote devices in order to identify network-reliant applications being used by said one or more user-devices;

in respect of each of a plurality of network-reliant applications identified as being used by said one or more user-devices, selecting from a plurality of different predetermined diagnostic testing procedures an applicable diagnostic testing procedure for obtaining a diagnostic test result in respect of the network-reliant application as experienced by the one or more user-devices identified as using said network-reliant application;

triggering the diagnostic testing procedures selected as being applicable whereby to obtain diagnostic test results in respect of the network-reliant applications as experienced by the one or more user-devices.

According to preferred embodiments, the diagnostic testing procedures are such that the diagnostic test results that will be obtained in respect of the network-reliant applications are likely to be indicative of measures of performance of the network-reliant applications as actually experienced by the one or more user-devices identified as using said network-reliant applications. The one or more user-devices may be identified as using the network-reliant applications concerned at a specific time of monitoring, or during a monitoring period in respect of which monitoring has been performed, for example.

According to preferred embodiments, a particular diagnostic testing procedure selected as being applicable for obtaining a diagnostic test result in respect of a particular network-reliant application as experienced by a particular user-device may be triggered to occur at a time when said user-device is not using the network-reliant application concerned. This may be in order to ensure that the performing of the testing procedure itself does not interfere with the user's use of the network-reliant application, or degrade the user's experience thereof. Alternatively, the particular diagnostic testing procedure may be triggered to occur at a time when the user-device is using the network-reliant application concerned. This may be in order to ensure that the results relate to the characteristic(s) concerned at the same time that they will actually be affecting the user's experience.

According to preferred embodiments, the network-reliant applications used by the one or more user-devices may include one or more of the following:
  (i) applications obtaining data from one or more remote servers for use by a web-browser, such as web-browsing applications and applications that are dependent thereon;
  (ii) applications providing data to one or more remote servers, such as applications for archiving or otherwise sending data to remote "cloud-based" repositories, for example;
  (iii) applications streaming data to and/or from one or more remote servers, such as audio and/or video streaming applications, for example;
  (iv) applications exchanging data with one or more remote user devices, such as "peer-to-peer" versions of any of the above, or other such "peer-to-peer" applications, for example. It will be apparent that other types may be being used instead or as well, however.

Similarly, it will be apparent that in relation to preferred embodiments, the remote networked devices may include one or more of the following:
  (i) one or more remote content servers, such as servers (or possibly Content Delivery Network nodes) providing web-page content or other data;
  (ii) one or more remote streaming servers (which are generally a type of content server, and may be CDN nodes, but may be specially adapted for streaming audio and/or video content to users);
  (iii) one or more remote user devices (which may be "peer" devices involved in "peer-to-peer" applications, for example).

According to preferred embodiments, the predetermined diagnostic testing procedures may include one or more of the following:
  (i) testing procedures for establishing connectivity between a user-device and a remote device;
  (ii) testing procedures for establishing data rate, delay, data loss and/or reliability in respect of data exchange between a user-device and a remote device;
  (iii) testing procedures for establishing a capability of a remote device.

According to preferred embodiments, a schedule of diagnostic testing procedures may be maintained for (i.e. at, by or on behalf of) the control module, the schedule being updated in respect of diagnostic testing procedures selected as being applicable in respect of network-reliant applications identified as being used by said one or more user-devices. In such embodiments, the step of triggering the diagnostic testing procedures selected as being applicable may comprise triggering diagnostic testing procedures as set out in (or otherwise in dependence on) the updated schedule. The schedule may be further updated in dependence on a period of time passing during which a particular network-reliant application is not identified as being used by the user-devices—this may be in order to decrease the frequency with which a diagnostic testing procedure applicable in respect of a particular network-reliant application is triggered if it becomes apparent that the network-reliant application has not been re-used, has not been used for a certain period of time, or is not being used frequently enough to justify any (or such frequent) testing.

According to preferred embodiments, the control module may be the network gateway device, may be a functional module of the network gateway device, or may be communicably coupled to the network gateway device (possibly as a separate local or remote unit).

According to preferred embodiments, the network gateway device may be a residential or local area network gateway device, such as a residential gateway router modem or "hub" device. This may have one or more external network interfaces for communication with the Internet, possibly via a local ISP or access network, and one or more internal network interfaces such as a WiFi interface for wireless communication with user devices within the home network, an Ethernet or other such interface for wired communication with user devices within the home network, and possibly other interfaces such as an LTE interface, for example.

According to a second aspect of the invention, there is provided a control module for obtaining diagnostic test results in respect of network-reliant applications used by one or more user-devices in a local user network, the one or more user-devices being operable to communicate with a digital communications access network via a network gateway device associated with the control module, and being operable to communicate with remote networked devices involved in said network-reliant applications via the access network, the control module comprising one or more processors operable to:
  monitor communications between the one or more user-devices and the remote devices in order to identify network-reliant applications being used by said one or more user-devices;
  select, in respect of each of a plurality of network-reliant applications identified as being used by said one or more user-devices, an applicable diagnostic testing procedure from a plurality of different predetermined diagnostic testing procedures, the applicable diagnostic testing procedure for a network-reliant application being a diagnostic testing procedure for obtaining a diagnostic test result in respect of the network-reliant application as experienced by the one or more user-devices identified as using said network-reliant application; and to
  trigger the diagnostic testing procedures selected as being applicable whereby to obtain diagnostic test results in respect of the network-reliant applications as experienced by the one or more user-devices.

According to a third aspect of the invention, there is provided a computer program product comprising computer program code to, when loaded into a computer system and executed thereon, cause the computer to execute all of the steps of a method according to the first aspect.

The various options and preferred embodiments referred to above in relation to the first aspect are also applicable in relation to the second and third aspects.

According to preferred embodiments, a control module (which may be a residential gateway router modem or "hub" device, or another such local area network gateway device, a part thereof, or a separate device associated with such a gateway device, for example) can thus direct its tests to those services that users actually use, and test connectivity to specific remote servers that user devices connect with or to networks that those entities reside on, or otherwise perform appropriate tests to obtain measures of the QoE indicative of those actually perceived by users. This can be done while users are not using those services or connecting with those end-systems or networks, and can ensure that (i) users can be informed if there is a problem in respect of any service, end-system or remote network they actually use (and the reason for that problem); (ii) network providers or ISPs can be informed if there may be a problem for a given customer.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus according to preferred embodiments will now be described.

Generally, a user network such as a home or residential network or local area network (LAN) includes a Gateway Device which allows communication between user devices within (or using) the user network and devices outside, via a wide area network (WAN), which itself may be a larger computer network such as a municipal WAN providing connectivity to residences within a municipality, or the Internet, for example.

In relation to home or residential networks, the primary functional components of a gateway device generally reside in a piece of equipment such as a residential gateway router modem or "Home Hub", which is generally located in a user's home, forming a part of the user's home network. A gateway device normally includes a wireless access point, which allows it to communicate wirelessly (e.g. using WiFi, Fourth Generation/Long Term Evolution (4G LTE, or simply "LTE"), etc.) with devices such as (WiFi-capable, LTE-capable, etc.) "smart-phones" and (WiFi-capable, LTE-capable, etc.) "lap-top" computers within the local network. It may also communicate wirelessly or via a wired connection with devices such as a "desk-top" computers, networked televisions, etc. within the local network.

Connectivity between the gateway device and the WAN or other such external network may be provided through Digital Subscriber Line (DSL) technology, a cable modem, a broadband mobile phone network, or other communication technologies.

By virtue of such connectivity, user-devices in a user network that are running network-reliant applications are able to communicate with external networks (including a network such as an access network) via a gateway device, and are thus able to communicate with remote networked devices involved in network-reliant applications via the external network(s).

A local area or home network gateway device such as a "Home Hub" is generally well-placed to intercept traffic travelling from or towards the user devices in the user network, analyse it and conduct or trigger other entities to conduct tests immediately or later, the results of which can be used to ensure that traffic traversing the gateway device is going to or is likely to achieve a sufficient QoE.

A technique will be described in which a method according to a preferred embodiment is implemented by a control module according to a preferred embodiment, the control module being within a local area or home network gateway device such as a "Home Hub".

Figure 1:
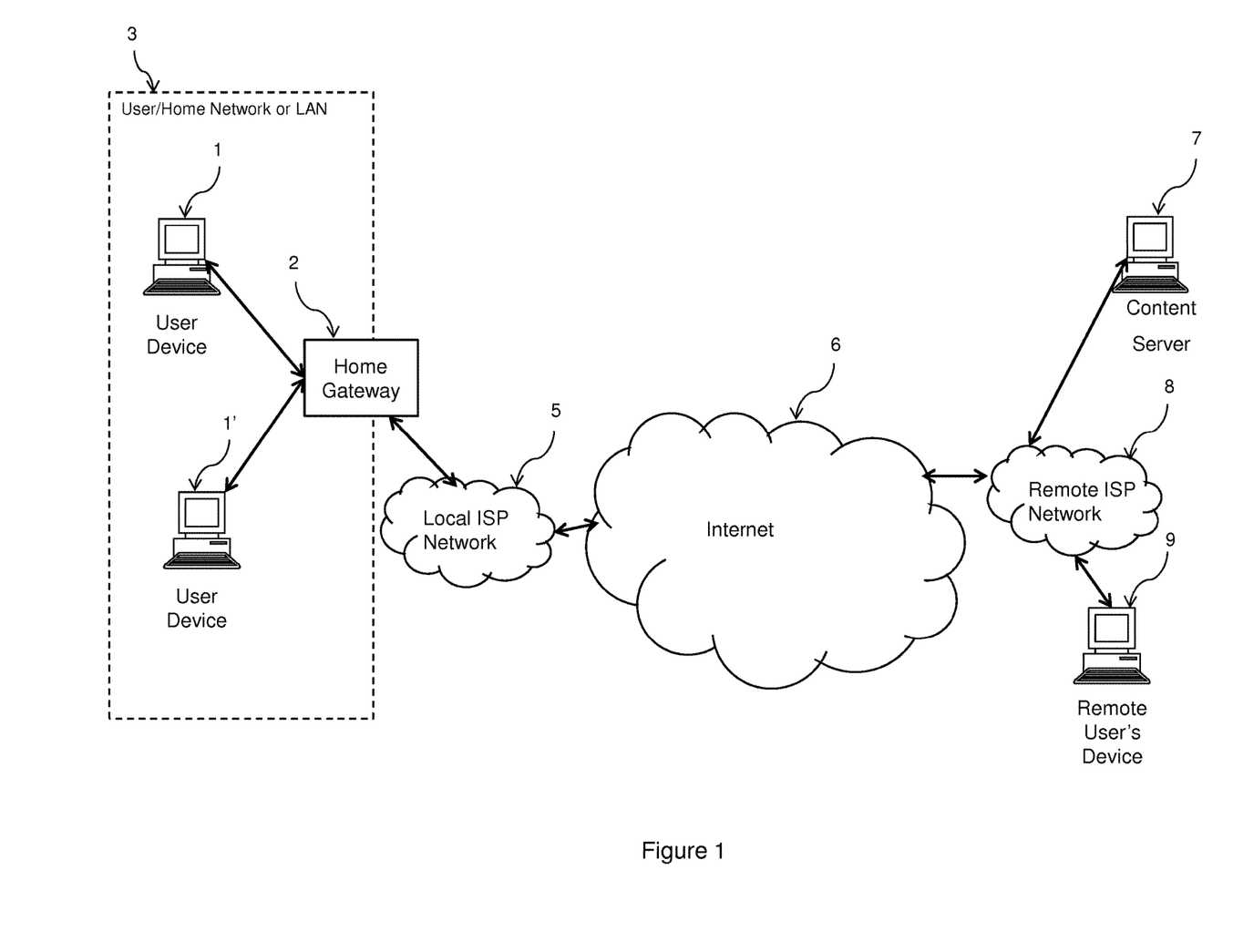
FIG. 1 shows entities that may be involved in the performance of a method according to a preferred embodiment.

FIG. 1 shows entities that may be involved in the performance of a method according to a preferred embodiment. User devices 1, 1' belonging to a customer or otherwise being used within the customer's home network 3 are connected to the Internet 6 via a control module in the form of a home gateway device 2 such that all broadband traffic from the user devices passes through the home gateway. It will be understood that the home network 3, which may be based on wired, wireless, or wired and wireless communication, will not in general have a hard or fixed boundary—particularly in cases where it is in part a wireless network, its extent will generally be affected by factors such as the signal strengths and other capabilities of the home gateway 2 and the user devices 1, by authentication/permission issues, by structural/architectural issues of the building, and by other factors.

The home gateway 2 is shown as being in communication with the Internet 6 via the customer's local ISP network 5, and with remote (networked) devices such as content servers 7, remote user's devices 9, etc., via other ISP networks 8 and/or otherwise. The home gateway 2 includes elements for performing various functions including those of a normal home gateway 2, as well as others that will be explained in more detail below.

Figure 2:
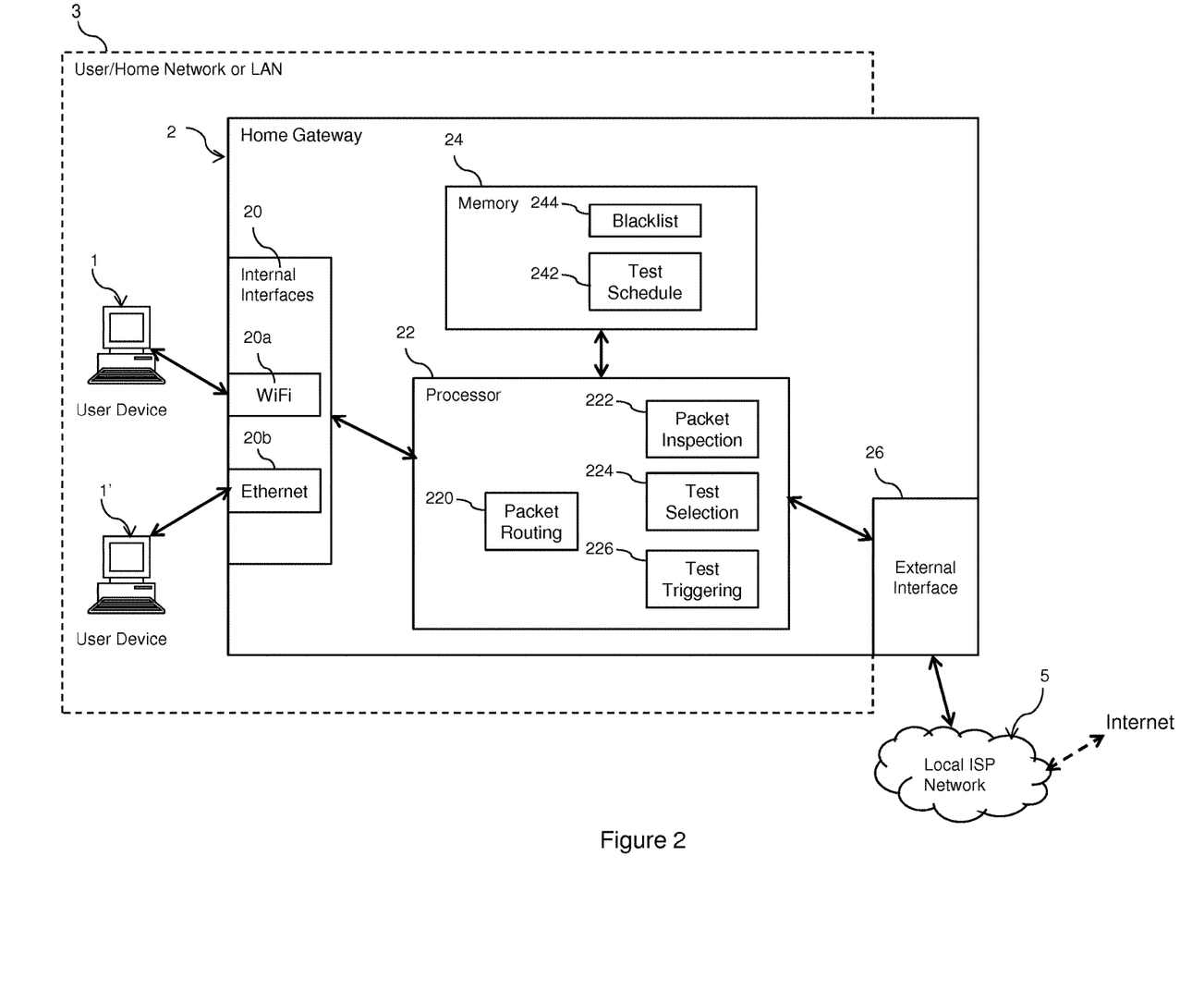
FIG. 2 illustrates functional modules that may be present within a home gateway performing a method according to a preferred embodiment, as well as other entities that may be in contact with such a home gateway.

FIG. 2 shows functional modules within the home gateway 2, as well as the entities from FIG. 1 that are in direct contact with the home gateway 2 (i.e. the user devices 1 and the local ISP network 5). The functional modules within the home gateway 2 include elements for performing various functions including those of a normal home gateway 2, as well as others that will be explained in more detail.

The home gateway 2 has one or more internal network interfaces 20, which may include a WiFi interface 20a for wireless communication within the home network 3 with user devices 1, an Ethernet interface 20b for wired communication within the home network with user devices 1, and possibly other interfaces (such as an LTE interface, for example). It also has at least one external (or Wide Area Network, WAN) network interface 26 by virtue of which it is in communication with the Internet 6 via local ISP network 5. The network interfaces 20, 26 are interfaces to devices for the input or output of data, or for both input and output of data.

The home gateway 2 also has one or more processors 22 forming central processor unit (CPU) which is communicatively connected to interfaces 20, 26 and to a data store or memory 24, which can be any read/write storage device or module or combination of devices/modules such as a random access memory (RAM) or a non-volatile storage device, and can be used for storing executable and/or non-executable data.

The processor 22 is shown as having functional modules for packet routing 220, packet inspection 222, test selection 224 and test triggering 226, the functions of which will be explained later. The memory 24 may have stored therein a test schedule 242 and a blacklist 244, which will also be explained later.

With reference to the above figures in particular, diagnostic test results can be obtained in respect of network-reliant applications being used by one or more user-devices 1 in a user network 3 which are operable to communicate with remote networked devices 7, 9 involved in those network-reliant applications via external networks such as local ISP network 5, the Internet 6, and other networks, and with the external networks via a home gateway or other such control module 2. According to a preferred embodiment, the diagnostic test results can be obtained in the following manner.

Within the home gateway 2 (or associated equipment comprising a control module), the packet inspection module 222 of the processor 22 monitors communications between the user-devices 1 and the remote devices 7, 9 in order to identify network-reliant applications being used by one or more of the user-devices 1. The identification of which network-reliant applications are being used may be achieved by identifying individual flows in respect of which packets (which are being received and forwarded by the packet routing module 220 of the processor 22 of the home gateway 2 on an ongoing basis) are being sent from and/or received by the user devices 1, or otherwise. Then, in respect of each network-reliant application identified as being used by one or more of the user-devices 1, the test selection module 224 of the processor 22 of the home gateway 2 (or associated equipment) selects the diagnostic testing procedure (from a predetermined set of diagnostic testing procedures) which is applicable (or the one which is most applicable) for obtaining a diagnostic test result in respect of the network-reliant application concerned, in order that diagnostic test results then obtained in respect of the network-reliant applications concerned will be indicative of the respective performances of the particular network-reliant applications as actually experienced by the user or users of the user-devices 1 that have been found to be using those network-reliant applications. The diagnostic testing procedures so-selected as being applicable can then be triggered by the test triggering module 226 of the processor 22, in order that the home gateway 2 (or associated equipment) may then obtain diagnostic test results in respect of the network-reliant applications as actually experienced by the user or users of the user-devices 1 that have been observed to be using the "in-use" network-reliant applications in the home network 3.

Some or all of the steps of the above method (i.e. monitoring communications between the user-devices 1 and the remote devices 7, 9, selecting appropriate testing procedures and triggering appropriate tests) can be performed by home gateway device 2 or appropriate modules thereof, thereby taking advantage of the normal topological and/or geographical location as well as the existing or normal functionality of such a device, while adapting this such as to enable it to monitor user traffic as required, perform the necessary processing, then trigger the appropriate tests. Some or all of the steps may alternatively be performed by one or more associated devices, in collaboration with the gateway device 2 or appropriate modules thereof.

As a result, a test schedule 242 (which is shown in FIG. 2 as being stored in the memory 24 of the home gateway 2, but may be held elsewhere) may be produced, based on the pattern of usage observed at the home gateway. Other information may also be obtained and/or stored in the memory 24 of the home gateway 2 or elsewhere, and used in relation to the above. For example, a blacklist 244 of websites not to be tested as part of the diagnostic technique may be stored. Such a blacklist may be desirable so that any websites that may be embarrassing to users are not displayed on any results web-page, for example.

Looking at this in more detail, it will be understood that for the purposes of testing, the entities that the local user or users will interact with may for example be divided into three categories:

1) Services such as websites and streaming servers;
2) Peers in applications such as VoIP where a local user of a device 1 is interacting with another specific, remote user of a remote device 9;
3) Peers where a local user of a device 1 is interacting with other non-specific peers such as in multi-player games or peer-to-peer sharing networks.

Other types of entity may also be involved.

Websites and streaming services can be implemented on content servers 7 or implemented as Content Delivery Networks (CDNs) which could themselves be integrated into the local ISP network 5. The content servers may connect to the Internet via another ISP network 8 or may be a load-balanced cluster of servers located on the service provider's own network. Only one mode of connection is shown in FIGS. 1 and 2 for the sake of clarity. For applications connecting to peers the applications will generally be communicating with a remote user device 9. This could be a specific device for applications such as VoIP or a number of non-specific remote devices for peer-to-peer file-sharing, etc.

These different categories of interaction hosting can be tested in different ways. Firstly there may be a bespoke test available. This may be a bespoke test such as one designed to test a specific service (such as "YouTube") or a specific technology such as "Smooth Streaming" (a video-streaming technology from Microsoft). With a Web download test the test is normally designed to work with a small range of websites to ensure that page downloading time obtained is equivalent to accessing the website. For any random website the exact timing is likely to be less accurate, however trends over time will generally be available. Most entities in the service category can be tested with such bespoke tests, or re-purposed bespoke tests.

For applications that take place between specific peers it is unlikely that the communicating peer will run a service that can be tested against; still less a test point offering to be a VoIP test-server, for example. However every IP address observed can be checked at a later time for connectivity either directly or at a level less deep in the corresponding network. Most IP addresses (particularly static, but also dynamic) will generally respond to a "Ping" test, for example. Such a test can be used to measure Round Trip Times and loss, for example.

Results from "Ping" tests performed at different times can be compared. Even if no absolute value can be determined it is generally still possible to determine from results over time whether QoE is better or worse than at some time previously. If no IP address is available to test to—as may be the case where, for example, a "Skype" or other such VoIP call was made (to most residential addresses, at least) then programs such as "traceroute" can be used to determine the last "ping-able" address (i.e. the most recent IP address that will respond to a "Ping" test). This will normally be the respondent's ISP. Thus connectivity to the remote ISP can be tested. It could be found, for example, that an ISP that a user often communicates via in order to contact a friend, relative or business associate via VoIP is unreliable. The user could be informed of this so that they know where the fault lies. The local ISP can also have access to this information to be warned about possible fault calls from the user.

For peer-to-peer sharing networks and multi-player games, bespoke tests may be required, but testing the availability of the overlay network (in the case of file-sharing) or game servers may be performed without the need for such bespoke tests.

In relation to services involving data providers such as video streaming servers, a bespoke testing procedure may involve performing a test or combination of tests in order to measure, in respect of the individual user and a particular data provision server, not just the quality of the connection between the data provision server and the individual user for downloading or streaming (e.g. a latency test), but also the current remaining capacity (or bandwidth) of that data provision server for providing data (downloading or streaming). A suitable bespoke testing procedure may therefore involve a specific combination of tests, possibly including a measurement (using a "Ping" or other such test, for example), in combination with a separate test (or even a request for information) in order to establish the data provision server's current utility level and/or capacity for providing data to an additional client.

It will be understood that other bespoke testing procedures (involving individual tests or combinations of tests) may be applicable in relation to other specific networked services or specific types of networked service.

In some cases, "dummy nodes" at appropriate network locations and having properties and/or capabilities similar to those of servers, peers or other nodes may be used that will respond to bespoke or other tests and allow the selected/applicable tests to be performed in respect of the actual nodes with which the user device 1 is interacting or has interacted.

Grouping:

Results and tests can be pooled amongst broadband or other users connecting to the same addresses/ISPs/services. Consider the case of a broadband user in the United Kingdom using "Skype" (or another such VoIP service) to communicate with a relative in Japan. Their personalised test may test connectivity to their relative's ISP in Japan. If another broadband user is also using Skype to communicate with someone else using the same Japanese ISP, then the tests can be pooled. Only one test needs to be done end-to-end. If both broadband users can access their own ISP and one can access end-to-end then it can be concluded that there is connectivity between the local ISP and the Japanese ISP. The results can be pooled so that all users who connect with the Japanese ISP can be informed of their lines' performance. This is probably most useful where there is a connectivity problem, and can mean that rather than phoning a helpdesk, the broadband user can be informed or discover that there is a problem with the ISP (or network as a whole) in Japan, for example.

Test Scheduling:

The frequency with which different services are used or the frequency of communications with different end-points may influence the regularity or frequency of tests. Most of the probe-based tests will have a suite of tests that may be performed according to a test schedule 242. With such "personal" or "personalised" QoE testing those services that are run or used most often can be tested most often. Consider a "YouTube test", for example. If a user accesses the "YouTube" service often, then this can be tested frequently to make sure that it is always available for that user (or indicate if it is not). If a user does not access the "YouTube" service often, infrequent testing of likely QoE in respect of "YouTube" servers may still be desirable, in case the user starts to use "YouTube", and also for an ISP to have a view on the QoE potentially experienced for all of its customers.

The schedule is preferably updated so that test frequency in respect of a particular application that has been identified as being used decays with time unless such use continues or is repeated within a certain period of time. This may be done to ensure that a one-off "Skype" (or other such VoIP) call to a friend or relative where that friend or relative is using their iPad at an internet café whilst on holiday does not cause repeated tests in respect of the VoIP application and/or the holiday location indefinitely, for example.

Figure 3:
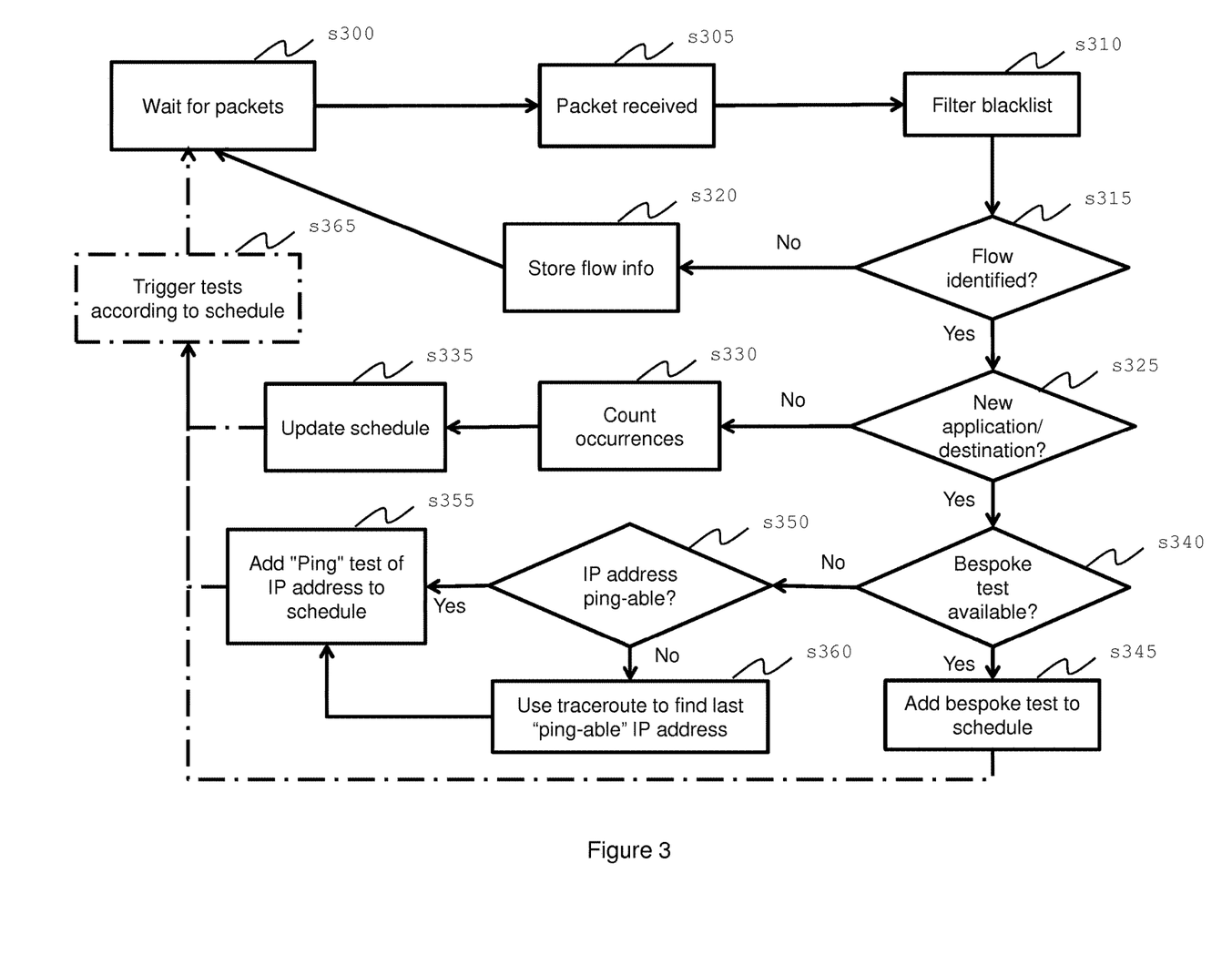
FIG. 3 is a flow-chart illustrating a method according to a preferred embodiment.

FIG. 3 is a flow-chart illustrating a method according to a preferred embodiment, which may be implemented in or by a home gateway 2 such as that shown in FIG. 2. The home gateway 2 waits for packets (s300). When a packet is received on one of its network interfaces (s305), the packet may be compared against a blacklist 244 (which is shown in FIG. 2 as being stored in the memory 24 of the home gateway 2, but may be held elsewhere) to remove addresses not to be tested (s310). The packet is examined in conjunction with others in the same flow (i.e. which may be on the basis that the packets have the same source IP address and source port, as well as the same destination IP address and destination port, or otherwise) once enough packets have been received to allow the flow to be identified (s315). If the flow cannot be identified then the flow info is stored (s320) and the process returns to waiting for packets (s300).

It will be noted that it is not generally possible to identify an application from the first packet observed in a flow—generally a number of packets need to be received to identify an application's signature. Various techniques exist for doing this, such as "Deep Packet Inspection" (DPI), which has previously been implemented in DPI middleboxes, and which may be performed here by the packet inspection module 222 of the processor 22. When the flow has been identified, it can be determined if it is a new application/destination pairing (s325) (i.e. where "new" can mean previously unseen by the processor, or not seen recently enough to remain stored in the memory 24, for example). It should be noted that the new "destination" may not simply be a new IP address, as many services will have multiple IP addresses. Such is the case where websites or streaming services use a cluster of servers or a CDN. Deciding on whether this is a new application/destination pairing can be done with information on CDNs and major content service providers. This can be supplemented by observing requests to the Domain Name Service (DNS). A DNS request for www.google.com will, for example, return one or more IP addresses. Subsequent packets observed sent to one of those IP addresses will thus be associated with access to the Google website.

If the application/destination pairing is not new then a count of the number of connections made to this pairing is recorded (s330) along with the timestamp for this new access attempt. A test schedule 242 (which is shown in FIG. 2 as being stored in the memory 24 of the home gateway 2, but may be held elsewhere) can then be updated (s335) so that more frequently accessed pairings can be tested more frequently and pairings not used for some time can be scheduled less frequently or de-scheduled altogether. Such changes will thus be reflected in the updated schedule, resulting in appropriate tests being triggered in accordance with the updated schedule at the next instance of testing (s365). The process can then end or proceed by returning to the start-point of waiting for packets (s300).

If a new application/destination pairing has been observed at step s325, then a new test will be added to the test schedule 242. First it is determined if a bespoke test is available (s340). Information relating to bespoke tests (and other tests) may be stored locally, in the memory 24 of the home gateway 2, for example, or may be obtained from elsewhere. It may be obtained from a communal or central remote memory shared with other control devices, for example, allowing the information to be updated centrally, rather than at each control device.

If a bespoke test is available, that test is added to the test schedule (s345). If a bespoke test is not available, the remote address may be checked to see if it responds to any known tests such as the "Ping" test discussed earlier (s350) or others, and if so, such a test (e.g. a "Ping" test of that address, of a (possibly designated) corresponding or similar address, or otherwise) can be scheduled (s355). If the IP address is not "ping-able" then a program such as "traceroute" can be used to find the last "ping-able" address (s360). Alternatively the test could be made to the /24 mask of the destination IP address, for example.

As before, such changes are then reflected in the updated schedule, resulting in appropriate tests being triggered in accordance with the updated schedule at the next instance of tests being triggered (s365), with the process then ending or proceeding by returning to the start-point of waiting for packets (s300).

It will be noted that the arrows leading to the step of "triggering tests" (s365) and to the step of "waiting for packets" (s300) are shown using "dot-dash" lines. This is in view of the fact that these two steps may in fact be performed on an ongoing basis, rather than simply in series each time any of steps s335, s345 or s355 have been performed.

The results of testing could be made available to users and/or the ISP so that monitoring can take place. The specific tests performed and/or websites tested do not necessarily need to be sent to the ISP, or even to the user—it may be decided only to report the level of QoE achieved to the ISP, for example.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of obtaining diagnostic test results in respect of network-reliant applications used by one or more user-devices in a local user network, the one or more user-devices being operable to communicate with a digital communications access network via a network gateway device having a control module associated therewith, and being operable to communicate with remote networked devices involved in said network-reliant applications via the access network, the method comprising:

the control module monitoring communications between the one or more user-devices and the remote devices in order to identify network-reliant applications being used by said one or more user-devices;

in respect of each of a plurality of network-reliant applications identified as being used by said one or more user-devices, selecting from a plurality of different predetermined diagnostic testing procedures an applicable diagnostic testing procedure for obtaining a diagnostic test result in respect of a respective network-reliant application as experienced by the one or more user-devices identified as using said respective network-reliant application; and triggering the diagnostic testing procedures selected as being applicable whereby to obtain diagnostic test results in respect of the plurality of network-reliant applications as experienced by the one or more user-devices; wherein a schedule of diagnostic testing procedures is maintained for the control module, the schedule being updated in respect of diagnostic testing procedures selected as being applicable in respect of network-reliant applications identified as being used by said one or more user-devices.

2. A method according to claim 1 wherein the diagnostic test results in respect of the network-reliant applications are indicative of measures of performance of the network-reliant applications as experienced by the one or more user-devices identified as using said network-reliant applications.

3. A method according to claim 1 wherein a particular diagnostic testing procedure selected as being applicable for obtaining a diagnostic test result in respect of a particular network-reliant application as experienced by a particular user-device is triggered to occur at a time when said user-device is not using said network-reliant application.

4. A method according to claim 1 wherein the network-reliant applications used by the one or more user-devices include one or more of the following:

(i) applications obtaining data from one or more remote servers for use by a web-browser;
   (ii) applications providing data to one or more remote servers;
   (iii) applications streaming data to and/or from one or more remote servers;
   (iv) applications exchanging data with one or more remote user devices.

5. A method according to claim 1 wherein the remote networked devices include one or more of the following:

(i) one or more remote content servers;
   (ii) one or more remote streaming servers;
   (iii) one or more remote user devices.

6. A method according to claim 1 wherein the predetermined diagnostic testing procedures include one or more of the following:

(i) testing procedures for establishing connectivity between a user-device and a remote device;
(ii) testing procedures for establishing data rate, delay, data loss and/or reliability in respect of data exchange between a user-device and a remote device;
(iii) testing procedures for establishing a capability of a remote device.

7. A method according to claim 1 wherein the step of triggering the diagnostic testing procedures selected as being applicable comprises triggering diagnostic testing procedures in dependence on the updated schedule.

8. A method according to claim 1 wherein the schedule is further updated in dependence on a period of time passing during which a particular network-reliant application is not identified as being used by said one or more user-devices, whereby to decrease the frequency with which a diagnostic testing procedure applicable in respect of the particular network-reliant application is triggered.

9. A method according to claim 1 wherein the control module is the network gateway device, is a part of the network gateway device, or is communicably coupled to the network gateway device.

10. A method according to claim 1 wherein the network gateway device is a residential or local area network gateway device.

11. A method according to claim 1 wherein the network gateway device is a router modem device.

12. A control module for obtaining diagnostic test results in respect of the plurality of network-reliant applications used by one or more user-devices in a local user network, the one or more user-devices being operable to communicate with a digital communications access network via a network gateway device associated with the control module, and being operable to communicate with remote networked devices involved in said plurality of network-reliant applications via the access network, the control module comprising one or more processors adapted to:
monitor communications between the one or more user-devices and the remote devices in order to identify the plurality of network-reliant applications being used by said one or more user-devices;
select, in respect of each of a plurality of network-reliant applications identified as being used by said one or more user-devices, an applicable diagnostic testing procedure from a plurality of different predetermined diagnostic testing procedures, the applicable diagnostic testing procedure for a respective network-reliant application being a diagnostic testing procedure for obtaining a diagnostic test result in respect of the respective network-reliant application as experienced by the one or more user-devices identified as using said respective network-reliant application; and to
trigger the diagnostic testing procedures selected as being applicable whereby to obtain diagnostic test results in respect of the plurality of network-reliant applications as experienced by the one or more user-devices; wherein
a schedule of diagnostic testing procedures is maintained for the control module, the schedule being updated in respect of diagnostic testing procedures selected as being applicable in respect of network-reliant applications identified as being used by said one or more user-devices.

13. A non-transitory computer storage medium storing computer program code to, when loaded into a computer system and executed thereon, cause the computer to execute steps for obtaining diagnostic test results in respect of network-reliant applications used by one or more user-devices in a local user network, the one or more user-devices being operable to communicate with a digital communications access network via a network gateway device having a control module associated therewith, and being operable to communicate with remote networked devices involved in said network-reliant applications via the access network, the steps comprising:
the control module monitoring communications between the one or more user-devices and the remote devices in order to identify network-reliant applications being used by said one or more user-devices;
in respect of each of a plurality of network-reliant applications identified as being used by said one or more user-devices, selecting from a plurality of different predetermined diagnostic testing procedures an applicable diagnostic testing procedure for obtaining a diagnostic test result in respect of a respective network-reliant application as experienced by the one or more user-devices identified as using said respective network-reliant application; and
triggering the diagnostic testing procedures selected as being applicable whereby to obtain diagnostic test results in respect of the plurality of network-reliant applications as experienced by the one or more user-devices; wherein
a schedule of diagnostic testing procedures is maintained for the control module, the schedule being updated in respect of diagnostic testing procedures selected as being applicable in respect of network-reliant applications identified as being used by said one or more user-devices.

14. The control module according to claim 12 wherein the diagnostic test results in respect of the network-reliant applications are indicative of measures of performance of the network-reliant applications as experienced by the one or more user-devices identified as using said network-reliant applications.

15. The control module according to claim 12 wherein a particular diagnostic testing procedure selected as being applicable for obtaining a diagnostic test result in respect of a particular network-reliant application as experienced by a particular user-device is triggered to occur at a time when said user-device is not using said network-reliant application.

16. The control module according to claim 12 wherein the network-reliant applications used by the one or more user-devices include one or more of the following:
(i) applications obtaining data from one or more remote servers for use by a web-browser;
(ii) applications providing data to one or more remote servers;
(iii) applications streaming data to and/or from one or more remote servers;
(iv) applications exchanging data with one or more remote user devices.

17. The control module according to claim 12 wherein the predetermined diagnostic testing procedures include one or more of the following:
(i) testing procedures for establishing connectivity between a user-device and a remote device;
(ii) testing procedures for establishing data rate, delay, data loss and/or reliability in respect of data exchange between a user-device and a remote device;
(iii) testing procedures for establishing a capability of a remote device.

18. The control module according to claim 12 wherein:
the step of triggering the diagnostic testing procedures selected as being applicable comprises triggering diagnostic testing procedures in dependence on the updated schedule.

19. The control module according to claim 12 wherein:
the schedule is further updated in dependence on a period of time passing during which a particular network-reliant application is not identified as being used by said one or more user-devices, whereby to decrease the frequency with which a diagnostic testing procedure applicable in respect of the particular network-reliant application is triggered.

* * * * *